United States Patent [19]

Honickman et al.

[11] Patent Number: 4,964,067

[45] Date of Patent: Oct. 16, 1990

[54] COMPUTER OUTPUT PRINTER WITH PLOTTER EMULATION

[75] Inventors: Aline M. Honickman; John L. Steeves, both of Rochester; Michael A. Higgins, Fairport; Anna M. Frary, Rochester, all of N.Y.

[73] Assignee: Eastman Kodak Company, Rochester, N.Y.

[21] Appl. No.: 338,665

[22] Filed: Apr. 11, 1989

[51] Int. Cl.$^5$ .............................................. G06F 15/00
[52] U.S. Cl. .................................. 364/520; 346/140 R
[58] Field of Search ............................... 364/518–520; 346/140 R, 154

[56] References Cited

U.S. PATENT DOCUMENTS

| | | | |
|---|---|---|---|
| 3,909,831 | 9/1975 | Marchio et al. | 346/140 R |
| 4,135,245 | 1/1979 | Kemplir et al. | 364/520 |
| 4,282,536 | 8/1981 | Paschen et al. | 346/140 R |
| 4,688,031 | 8/1987 | Haggerty | 364/520 |

OTHER PUBLICATIONS

Mannesmann Tally MT910.

Primary Examiner—Arthur G. Evans
Attorney, Agent, or Firm—Thomas H. Close

[57] ABSTRACT

A computer output printer includes a host computer interface that enables the printer to emulate a color pen plotter. Pen select commands are interpreted to select a halftone dot pattern, and plot commands are interpreted to define an outline of the line to be plotted, and fill the outline with the selected halftone dot pattern.

4 Claims, 4 Drawing Sheets

COMPUTER OUTPUT PRINTER WITH PLOTTER EMULATION

TECHNICAL FIELD

The present invention relates to a computer output printer, and more particularly to such a printer capable of emulating a plurality of other manufacturer' printers.

BACK ART

It is known to provide a computer output printer with an interface option so that the printer can emulate a number of manufactures printers such as the Hewlett-Packard Laser Jet TM or Epson ® printers. For example, see the MT910 printer sold by the Mannesmann Tally Corp. This feature is desirable since the printer can readily be used with a computer that has been programmed to drive another manufacturers printer without the need to reprogram the computer. Another popular computer output device is the color graphics plotter. For example see the HP 7475A plotter manufactured by the Hewlett-Packard Co. Many computers are programmed to drive a color platter, but single color printers (e.g. black on white) have not been provided with means for emulating these platters. It is therefore the object of the present invention to provide a blank-and-white computer output printer that overcomes the above noted shortcoming in the prior art.

DISCLOSURE OF THE INVENTION

The object is achieved according to the present invention by providing a computer output printer of the type having a host computer interface capable of emulating a plurality of other manufacturers printers with an improved host computer interface including means for generating a plurality of halftone dot patterns, each dot pattern corresponding to a different plotter pen; means for interpreting pen selection commands to select a corresponding halftone dot pattern; means for interpreting a plotting command to define an outline of a line to be plotted by the pen; and means for filling the outline with the halftone dot pattern corresponding to the selected pen.

MODES FOR CARRYING OUT THE INVENTION

Figure 1:
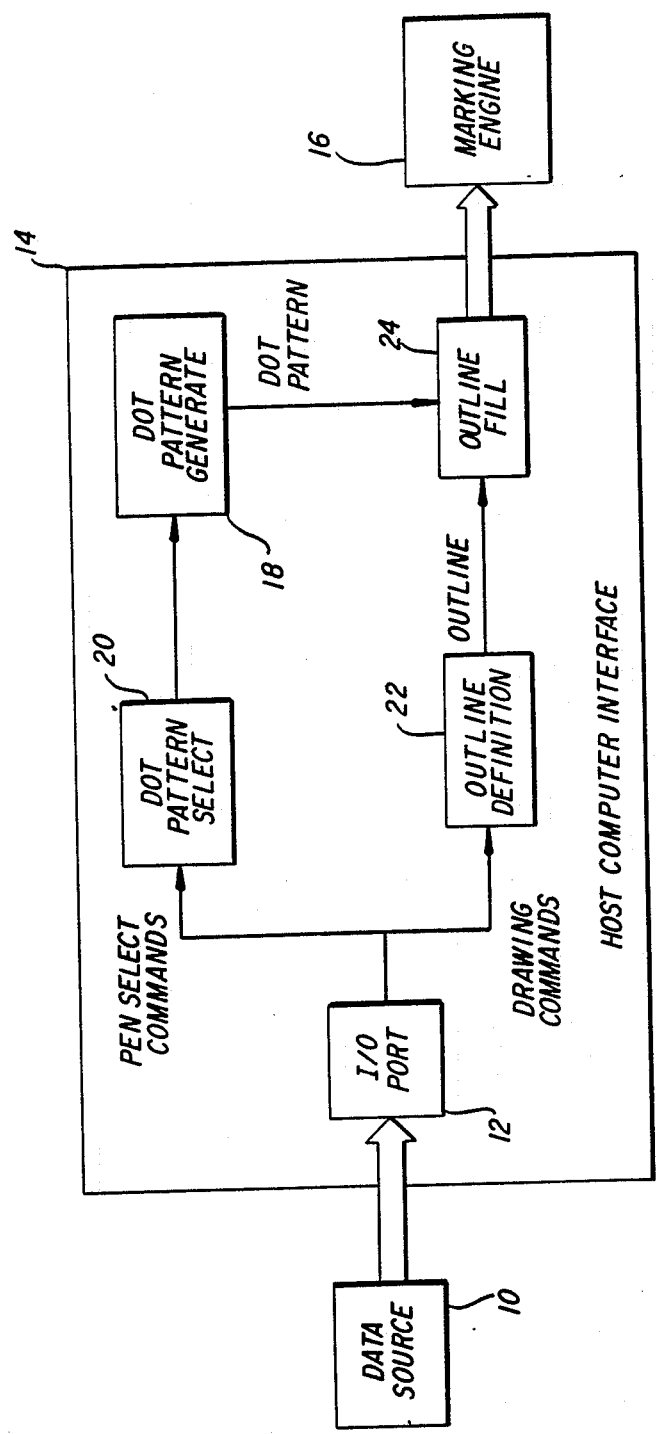
FIG. 1 is a schematic block diagram showing the host computer interface for a computer output printer according to the present invention.

FIG. 1 is a functional block diagram illustrating a printer having a host computer interface according to the present invention. A data source 10, for example a personal computer programmed to drive a color plotter, is connected to a port 12 in a host computer interface 14. The port 12 is a conventional port for communicating using a standard protocol such as RS-232 or Centronics. The host computer interface 14 receives plotter commands at the input port, translates the plotter commands to print commands for an all points addressable marking engine 16, and drives the marking engine. The host computer interface includes means for generating a plurality of halftone dot patterns 18, each dot pattern corresponding to a different plotter pen. Pen select commands from the data source 10 are interpreted 20 to select a corresponding one of the dot patterns. Plot commands from the data source 10 are interpreted 22 to define an outline of the vector to be plotted. For example, straight lines and arcs are defined as long, thin rectangles, and points are defined as small circles. When the outlines have been defined, the outlines are filled 24 with the halftone dot pattern corresponding to the color of the pen that was selected to plot the line. The dot patterns are sent to the all points addressable marking engine 16 to generate the image. The marking engine 16 can be, for example, an ink jet, dot matrix or electrophotographic type printer.

Figure 2:
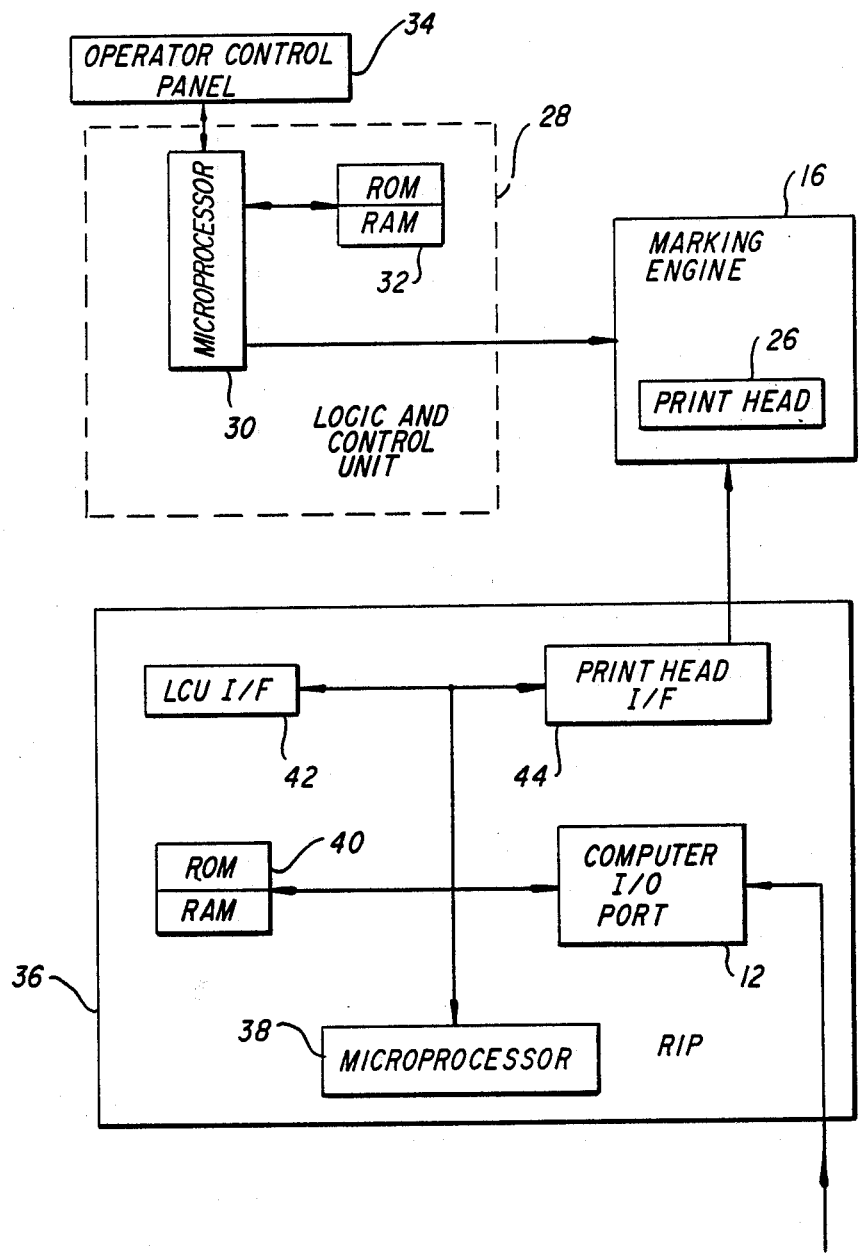
FIG. 2 is a schematic hardware diagram of the computer output printer.

A hardware design of a printer according to the present invention is shown in FIG. 2. The printer includes the marking engine 16 having a print head 26. A microprocessor based logic and control unit 28, including a microprocessor 30 and associated random access (RAM) and read only (ROM) memory 32, receives inputs from an operator control panel 34, and controls the operation of the marking engine 16.

The printer also includes a raster image processor (RIP) 36 that provides the functions of the host computer interface 14 described in FIG. 1. The RIP 36 receives coded print commands from the data source, generates bit patterns to produce the desired print out, and drives the print head 26 with the bit patterns. The RIP 36 includes a microprocessor 38, and associated ROM and RAM memory 40. The memory includes random access memory (RAM) for page buffering, and read only memory (ROM) for storing fonts and bit patterns for the graphic plotter emulation. The RIP 36 also includes an LCU interface 42, a print head driver 44, and the host computer input port 12.

Figure 3:
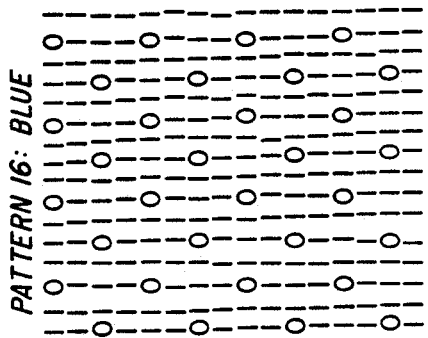
FIG. 3 is a diagram useful in describing the halftone dot patterns employed to emulate a color plotter.
Figure 3:
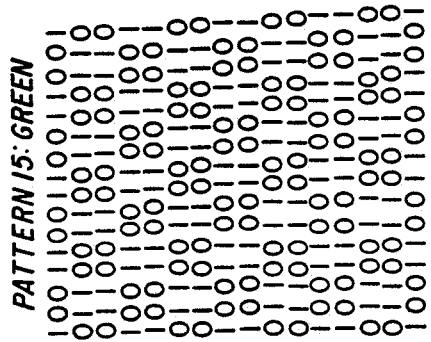
Figure 3:
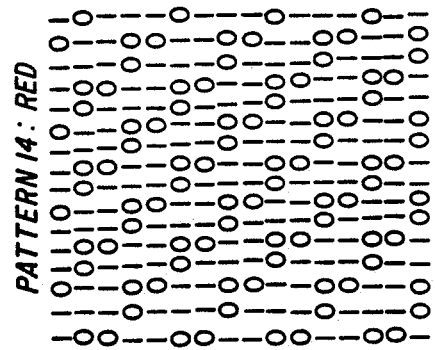
Figure 3:
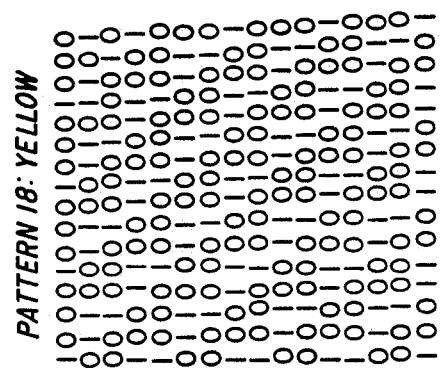
Figure 3:
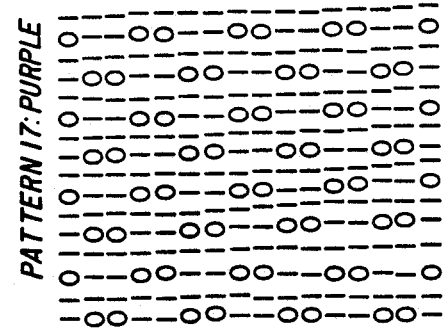

The bit map patterns to produce halftones corresponding to the pen colors are stored in the ROM portion of memory 40. The bit map patterns corresponding the red, green, blue, purple, and yellow are shown in FIG. 3, where 1's indicate where a dot is to be printed and 0's where no dot will be printed. These patterns are modularly addressed by the microprocessor 38 to fill the outlines in the page buffer in the RAM portion of memory 40.

A pen select command in the plotter language is interpreted as a command to select one of the halftone dot patterns. The default value of the pen select command is black (i.e. all 1's in the dot pattern).

The plotter commands from the data source are interpreted to define a polygon that represents the outline of a line to be plotted by the plotter, and to fill the outline with the pattern corresponding to the selected pen.

For example, a list of plotter commands to draw a green line from point $X_1,Y_1$ to $X_2,Y_2$ is shown in Table I.

TABLE I

Select Pen—Green
Pen up
Move pen to point $X_1,Y_1$
Pen down
Move pen to point $X_2,Y_2$ This sequence of commands is translated to the commands shown in Table II.

TABLE II

Set Color—Pattern 15
Draw Vector (P$_1$, P$_2$)

(where P$_1$ is the point X$_1$Y$_1$ and P$_2$ is the point X$_2$Y$_2$.)

Figure 4:
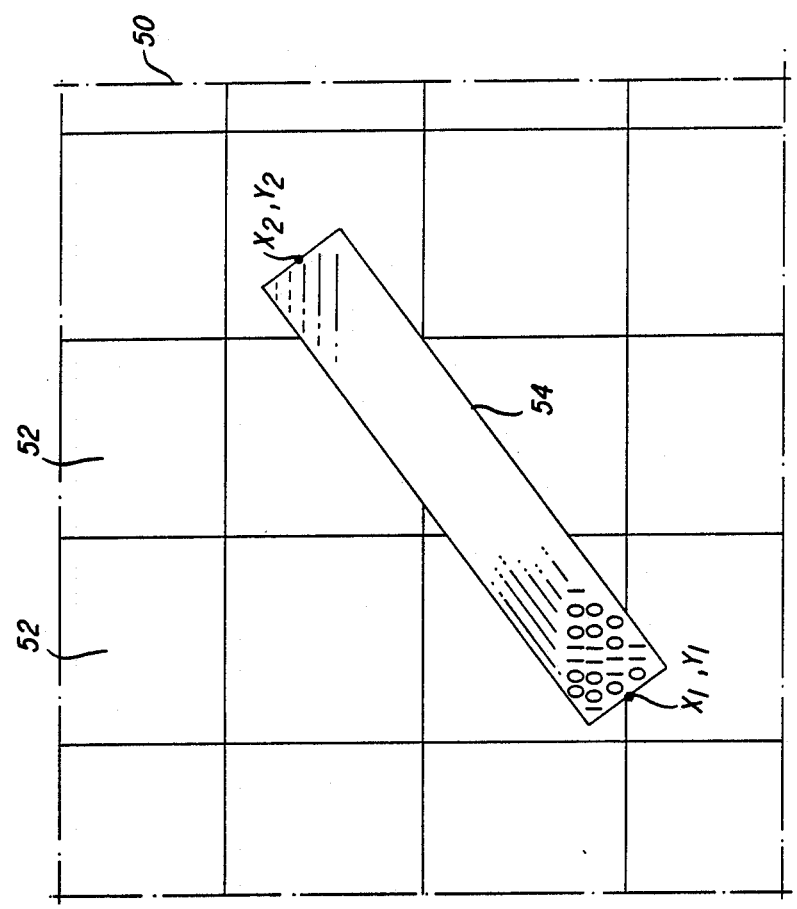
FIG. 4 is a diagram useful in describing the operation of the present invention.

In response to the Set Color command, the RIP 36 selects the dot pattern #15 (see FIG. 3) corresponding to the green pen. In response to the Draw Vector command, the RIP 36 converts the outline of a rectangle that is 4 pixels wide between points P$_1$ and P$_2$ to memory addresses, and recovers the bit patterns from the memory pattern #15 by modularly addressing the memory. Modular addressing is achieved by addressing the memory with the low order bits in the address words. The rectangle is filled as if the entire page were repetitively tiled by the bit pattern, and the outline of the rectangle was overlaid on a portion of the bit pattern. An example of this process is shown graphically in FIG. 4, where a portion of a page 50 is tiled with the 16×16 bit patterns 52 corresponding to the green pen. A vector 64 from points X$_1$,Y$_1$ to X$_2$,Y$_2$ (4 bits wide) is overlayed on the tiled bit pattern, and the outline is filled with 1's and 0's from the bit pattern.

Industrial Utility and Advantages

The present invention is useful in computer output printers, and has the advantage that the computer output printer can be employed to emulate a color pen plotter thereby increasing the utility of the printer.

We claim:

1. In a computer output printer of the type having a host computer interface capable of emulating a plurality of other manufacturers printers, the improvement comprising:
the host computer interface emulating a color pen plotter having a plurality of plotter pens, including,
   (a) means for generating a plurality of halftone dot patterns, each dot pattern corresponding to a different plotter pen;
   (b) means for interpreting pen selection commands to select a corresponding halftone dot pattern;
   (c) means for interpreting a plotting command to define an outline of the line to be plotted; and
   (d) means for filling the outline of the line with the outline dot pattern corresponding to the selected pen.

2. The improvement claimed in claim 1, wherein the means for generating a plurality of halftone dot patterns comprises a memory for storing said dot patterns in rectangular arrays that cover less than one page, and means for modularly addressing said memory.

3. The improvement claimed in claim 2, wherein the dot patterns are 16×16 bit arrays.

4. A method of driving a monochrome all-points addressable printer to emulate a color pen plotter having differently colored pens, the color pen plotter commands including commands for selecting pens, and commands for plotting lines with a selected pen, comprising the steps of:
   (a) providing a plurality of bit maps representing halftone dot patterns, each dot pattern corresponding to a different plotter pen;
   (b) interpreting a pen selection command to select a corresponding halftone dot pattern;
   (c) interpreting a plot command to produce an outline of the line to be plotted;
   (d) filling the outline of the line to be plotted with the halftone dot pattern; and
   (e) driving the all-points addressable printer with the filled dot patterns.

* * * * *

UNITED STATES PATENT AND TRADEMARK OFFICE
CERTIFICATE OF CORRECTION

PATENT NO. : 4,964,067

DATED : October 16, 1990

INVENTOR(S) : Aline M. Honickman et al.

It is certified that error appears in the above-identified patent and that said Letters Patent is hereby corrected as shown below:

Col. 1, lines 20 & 21　　　　Delete "platter" and substitute therefor --plotter--;

Col. 1, line 23　　　　Delete "platter" and substitute therefor --plotter--;

Col. 1, line 25　　　　Delete "platters" and substitute therefor --plotters--;

Col. 1, line 26　　　　Delete "blank" and substiture therefor --black--.

Signed and Sealed this

Twenty-first Day of April, 1992

Attest:

HARRY F. MANBECK, JR.

*Attesting Officer*　　　　*Commissioner of Patents and Trademarks*